US009075664B2

(12) United States Patent
Kannan et al.

(10) Patent No.: US 9,075,664 B2
(45) Date of Patent: Jul. 7, 2015

(54) APPLICATION DEPENDENT DATA CENTER INTEGRATION

(75) Inventors: Hariharan Kannan, San Jose, CA (US); Sean Gilmour, Dublin, CA (US); Mohit Kshirsagar, Santa Clara, CA (US); Akshaya Mahapatra, San Jose, CA (US)

(73) Assignee: VCE Company, LLC, Richardson, TX (US)

( * ) Notice: Subject to any disclaimer, the term of this patent is extended or adjusted under 35 U.S.C. 154(b) by 319 days.

(21) Appl. No.: 13/597,104

(22) Filed: Aug. 28, 2012

(65) Prior Publication Data
US 2014/0068032 A1 Mar. 6, 2014

(51) Int. Cl.
G06F 9/50 (2006.01)
H04L 12/46 (2006.01)
H04L 12/931 (2013.01)
H04L 29/12 (2006.01)
H04L 12/24 (2006.01)

(52) U.S. Cl.
CPC .......... *G06F 9/5077* (2013.01); *H04L 12/4641* (2013.01); *H04L 49/354* (2013.01); *H04L 61/2007* (2013.01); *H04L 61/2503* (2013.01); *H04L 61/2069* (2013.01); *H04L 61/20* (2013.01); *H04L 41/0843* (2013.01)

(58) Field of Classification Search
CPC ... H04L 12/4641; H04L 49/354; H04L 61/20; H04L 61/2007; H04L 61/2069; H04L 61/2503
USPC ................. 709/220, 231, 224, 221; 717/104; 726/4, 12; 711/112; 434/362; 715/763; 707/779
See application file for complete search history.

(56) References Cited

U.S. PATENT DOCUMENTS

| 6,349,306 | B1 * | 2/2002 | Malik et al. .................. 707/779 |
| 7,210,143 | B2 | 4/2007 | Or et al. |
| 7,249,189 | B2 | 7/2007 | Refai et al. |
| 2003/0126202 | A1 | 7/2003 | Watt |
| 2007/0198665 | A1 * | 8/2007 | De Matteis et al. ........... 709/220 |
| 2008/0250405 | A1 | 10/2008 | Farhangi et al. |
| 2008/0270973 | A1 * | 10/2008 | Edwards et al. .............. 717/104 |
| 2010/0071035 | A1 * | 3/2010 | Budko et al. ...................... 726/4 |
| 2010/0121975 | A1 * | 5/2010 | Sinha et al. ................... 709/231 |
| 2010/0299478 | A1 * | 11/2010 | Runcie et al. ................. 711/112 |
| 2011/0161947 | A1 | 6/2011 | Ashok et al. |
| 2011/0269111 | A1 * | 11/2011 | Elesseily et al. .............. 434/362 |

(Continued)

OTHER PUBLICATIONS

Kannan et al. "Packaged Application Delivery for Converged Infrastructure", U.S. Appl. No. 13/597,125, filed Aug. 28, 2012.

(Continued)

*Primary Examiner* — Le H Luu
(74) *Attorney, Agent, or Firm* — Polsinelli PC

(57) ABSTRACT

A method and apparatus for integrating a converged infrastructure platform in a data center is provided. The described apparatus configures the physical and virtual resources that run on the converged infrastructure to communicate with the rest of the data center. The network integration process understands the data center network already in place and extends the set up into the converged infrastructure to enable communication between the converged infrastructure and the rest of the network in the data center. The apparatus uses an infrastructure template that describes the data center and that may be pre-defined for a specific application deployed within the converged infrastructure platform.

27 Claims, 4 Drawing Sheets

(56) References Cited

U.S. PATENT DOCUMENTS

| | | | |
|---|---|---|---|
| 2012/0137235 A1* | 5/2012 | T S et al. | 715/763 |
| 2012/0266231 A1* | 10/2012 | Spiers et al. | 726/12 |
| 2013/0007265 A1* | 1/2013 | Benedetti et al. | 709/224 |

OTHER PUBLICATIONS

Kshirsagar et al. "Deployed Application Factory Reset", U.S. Appl. No. 13/597,150, filed Aug. 28, 2012.

F.Oliveira et al: "Blutopia: Cluster Life-cycle Management", Nov. 7, 2005, XP055089018, retrieved from the Internet: URL:http://domino.research.ibm.com/library/cyberdig.nsf/papers/5A54BE032FC9E8F4852570B5005F82D6/$File/rc23784.pdf [retrieved on Nov. 19, 2013] pgare 3-p. 5, p. 9.

International Search Report for PCT Application No. PCT/US2013/057075, dated Nov. 28, 2013.

* cited by examiner

APPLICATION DEPENDENT DATA CENTER INTEGRATION

BACKGROUND OF THE INVENTION

1. Field of the Invention

Embodiments of the present invention generally relate to a method for integrating a computing block platform within an existing data center.

2. Description of the Related Art

Generally, in a virtualized computer environment, virtual machines are configured to run on one or more host computers. Each virtual machine uses CPU and memory resources of one of the host computers and runs its own operating system and application programs to give the appearance that it is operating as a stand-alone computer system. The amount of CPU and memory resources provisioned for each of the virtual machines on a host computer can be designated by an administrator of the virtualized computer environment. In some virtualized environments, load balancing is enforced across multiple host computers by software that monitors resource usage on different host computers. Such software migrates virtual machines from one host computer to another, e.g., from a busy host computer to one that has excess capacity.

Additionally, enterprises engaged in developing, testing, and deploying software applications need to deal with many layers of the targeted platform. These layers include application services, virtualization, and hardware infrastructure with compute, network, storage, and management at all levels. Information technology (IT) and engineering groups also acquire, deploy, and provide ongoing management, as well as ensure the layers work seamlessly together. This increases an enterprise's initial and ongoing cost, extends the development cycle, and reduces flexibility needed to respond to changes in the market.

Further, the traditional enterprise information technology (IT) roles such as server administrator, UNIX administrator, and network, storage or exchange administrator, have been generally static. The roles operate in isolation, or "silos", which cause friction within IT organizations, as well as between developers and IT. Further, it is difficult for developers to play the role of IT administrator when their developed applications are deployed as "cloud applications." This difficulty is due not only to various access-controls, authentication and authorization complexities, but also to a model of organizational separation between developers and IT, where the default behavior is to deny access to the resources.

As such, there is a demand for a more efficient operational model for administrating computing infrastructure.

SUMMARY OF THE INVENTION

Embodiments of the present disclosure provide a method for deploying an integrated computing platform into an existing computing environment. The method generally includes generating an infrastructure template having a plurality of infrastructure parameters that specify configurations of a service executing within the existing computing environment. The method further includes modifying a configuration of networking and virtual resources from the integrated computing platform configured to execute one or more functional components of an application. The configuration is modified based on the infrastructure template to enable communication between the functional components of the application and the service executing within the existing computing environment.

Embodiments of the present disclosure provide a computing system for deploying an integrated computing platform into an existing computing environment. The computing system includes a management server configured to generate an infrastructure template having a plurality of infrastructure parameters that specify configurations of a service executing within the existing computing environment. The management server is further configured to modify a configuration of networking and virtual resources from the integrated computing platform configured to execute one or more functional components of an application, wherein the configuration is modified based on the infrastructure template to enable communication between the functional components of the application and the service executing within the existing computing environment.

Embodiments of the present disclosure provide a non-transitory computer-readable storage medium comprising instructions that, when executed in a computing device, deploy an integrated computing platform into an existing computing environment. The instructions, when executed, perform the steps of generating an infrastructure template having a plurality of infrastructure parameters that specify configurations of a service executing within the existing computing environment. The instructions further perform the steps of modifying a configuration of networking and virtual resources from the integrated computing platform configured to execute one or more functional components of an application, wherein the configuration is modified based on the infrastructure template to enable communication between the functional components of the application and the service executing within the existing computing environment.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments of the present disclosure use a computing block platform, sometimes referred to as converged infrastructure, that consolidates IT infrastructure into a pool of physical as well as virtualized computing, storage, and networking capacity that is shared by multiple application and lines of businesses have been proposed to address the problem of silo architectures and IT sprawl. When an enterprise uses a converged infrastructure platform, the enterprise may be faced with the challenge of integrating the new converged infrastructure platform within any existing computing infrastructure, such as a data center. Before a converged infrastructure platform can be used by an enterprise, the physical resources (e.g., blade servers, network switches, storages) and virtual machines that are "inside" the converged infrastructure platform have to be configured to communicate with physical resources and virtual machines that are "outside" the configured infrastructure platform, and vice versa. For example, the network within the converged infrastructure has to understand the data center network already in place, extend the network setup into the converged infrastructure platform, and enable communication between the converged infrastructure and the rest of the network in the data center. Further, a converged infrastructure platform may be pre-configured to run an application having multiple functional components. At least one of the functional components may rely on existing services running outside of the converged infrastructure. As such, certain functional components running in the converged infrastructure platform must be configured to communicate with any required services running in the existing data center (e.g., outside of the converged infrastructure platform).

Accordingly, embodiments of the present disclosure use an infrastructure template that is pre-defined for any application and that describes the existing computing environment (e.g., the data center). The converged infrastructure platform uses the information specified in the infrastructure template to configure its physical resources and virtual resources (e.g., VMs) to allow communication between the converged infrastructure and the rest of the data center.

Figure 1:
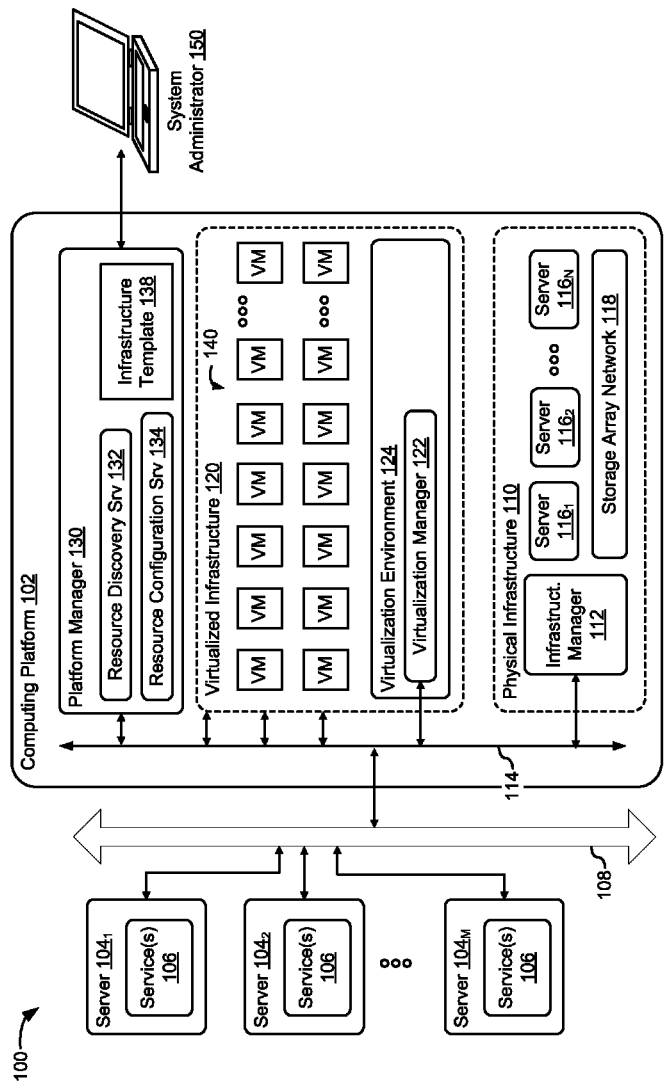
FIG. 1 illustrates an integrated computing platform configured for providing a virtualized environment according to one embodiment of the present disclosure.

FIG. 1 illustrates an integrated computing platform 102 configured to provide a virtualized environment, according to one embodiment of the present disclosure. A system administrator 150 desires to deploy the integrated computing platform 102 within an existing computing environment (e.g., data center 100). The data center 100 may include a plurality of servers (illustrated as servers $104_1$, $104_2$, $104_M$) that run one or more services 106. It should be recognized that the servers 104 may include conventional computing components (e.g., processor, memory, storage) or may be virtual machines (VMs) executing on such physical hardware. The services 106 running on the servers 104 provide one or more IT functions within the data center, including directory services, web server, database server, accounting, application serving, file management, storage, backup services, etc. As described in detail below, the system administrator may wish to deploy the integrated computing platform 102 such that the physical resources and virtual resources (e.g., VMs) running inside of the integrated computing platform 102 may communicate with the services 106 of the existing data center 100.

As shown, the computing platform 102 includes a physical infrastructure 110 configured to support a virtualized infrastructure 120. In the embodiment shown in FIG. 1, physical infrastructure 110 includes hardware resources, such as servers $116_1$ to $116_N$ (sometimes referred to as "hosts") and one or more storage array networks (SAN), such as SAN 118, connected by a network 114. The virtualized infrastructure 120 may include a virtualization environment 124 which itself includes one or more virtual machines 140. The computing platform 102 may be connected to other computing systems, such as workstations, personal computers, data center servers, via a network 128, such as the Internet. In one embodiment, components of the computing platform 102 (e.g., servers, network, storage, software, etc.) may be organized into a single integrated framework sometimes referred to as "converged infrastructure." The components of the computing platform 102 provide a pool of virtualized server, storage, network resources shared by multiple applications and/or organizations within an enterprise.

According to one embodiment, the physical infrastructure 110 may be organized into a "computing-block" based infrastructure, wherein physical infrastructure units are characterized by repeatable units of construction having similar performance, operational characteristics, and discrete requirements of power, space, and cooling that facilitate rapid deployment, integration, and scalability. For example, the "computing block" may dynamically provision hardware resources based on performance demands placed on the physical infrastructure 110. One example of physical infrastructure 110 is a Vblock™ System available from the VCE Company, LLC.

The physical infrastructure 110 further includes an infrastructure manager 112 configured to manage the configuration, provisioning, and policy compliance of the physical infrastructure 110. Infrastructure manager 112 provides an interface to manage the provisioning of hardware resources (e.g., computing, networking, storage) with policy-based automation. According to one embodiment, the infrastructure manager 112 may be included in each unit of physical infrastructure 110 to manage the configuration, provisioning, and compliance of each distinct computing block. The infrastructure manager 112 may simplify deployment and integration into IT service catalogs and workflow engines, and dramatically simplifies computing-block platform deployment by abstracting the overall provisioning while offering granular access to individual components for troubleshooting and fault management.

In one embodiment, the infrastructure manager 112 may include a configuration including a list of IP address and system credentials to assign newly provisioned systems. The platform manager 130 and/or the virtualized infrastructure 120 may connect to and communicate with the infrastructure manager 112 of the physical infrastructure 110 to manage and/or configure the physical infrastructure 110. One example of an infrastructure manager includes EMC Ionix Unified Infrastructure Manager (UIM) available from EMC Corporation. Similarly, the network 114 may include a network manager configured to configure network devices (e.g., switches, routers) and manage addressing, subnets, virtual local area networks (VLANs), and other network configurations. One example of a network manager includes a Cisco Switch accessible via a Cisco IOS command line interface (CLI) available from Cisco System, Inc.

The virtualized infrastructure 120 includes a virtualization environment 124 configured to simulate (i.e., to virtualize) conventional components of a computing device, e.g., a processor, system memory, a hard disk drive, for executing one or more virtual machines 140. For example, each virtual machine 140 may include a virtual processor and a virtual system memory configured to execute an application. In one example implementation of an embodiment similar to that of FIG. 1, virtualization environment 124 may be implemented by running VMware vSphere®—or VMware ESX®-based hypervisor technologies on servers $116_1$ to $116_n$ provided by VMware, Inc. of Palo Alto, Calif. (although it should be recognized that any other virtualization technologies, including Xen® and Microsoft Hyper-V virtualization technologies may be utilized consistent with the teachings herein). As described above, a hypervisor application may provide a foundation for building and managing a virtualized IT infrastructure, such as the virtualized infrastructure 120. The hypervisor may abstract processor, memory, storage and networking resources into multiple virtual machines that run unmodified operating systems and applications.

In one embodiment, the virtualized infrastructure 120 may be managed by a virtualization manager 122 (e.g., implemented as a process running in a virtual machine in one embodiment). In one embodiment, the virtualization manager 122 may provide end-to-end datacenter management through a set of APIs that enable integration with third-party management tools. The virtualization manager 122 may be configured to manage provision of VMs 140 within the virtualized infrastructure 120 and to configure VMs 140 with computing, network, and storage configurations suitable for interoperability with other VMs 140 within the virtualized infrastructure 120. One example of the virtualization manager 122 may be the VMware vCenter virtualized management platform from available from VMware, Inc.

As shown, the computing platform 102 also includes a platform manager 130 connected to the virtualized infrastructure 120 and physical infrastructure 110 by the communications network. The platform manager 130 is configured to provision and configure resources from physical infrastructure 110 and virtualized infrastructure 120 for use in deploying an application within the computing platform 102. For example, if virtualized infrastructure 120 requires additional VMs to scale a currently running application during peak traffic, platform manager 130 can coordinate with the virtualization manager 122 to instantiate additional virtual machines to support such needs and configure the instantiated virtual machines with network settings matching those existing virtual machines.

As shown, the platform manager 130 includes a resource discovery service 132 configured to identify resources (e.g., servers 104, services 106) that are of interest to the system administrator 150 seeking to connect the newly-deployed computing platform 102 with the rest of the data center 100. In some embodiments, the resource discovery service 132 may identify network switches and blades of network 108 that have to be configured to allow communication between the computing platform 102 and the rest of existing data center 100.

In one embodiment, the platform manager 130 is configured to generate an infrastructure template 138 based on the resources identified by the resource discovery service 132. The infrastructure template 138 includes infrastructure parameters that describe the existing computing environment (e.g., data center 100) in which the integrated computing platform 102 is being deployed. Examples of infrastructure parameters specified by the infrastructure template 138 include: VLAN identifiers that the network 114 of the computing platform 102 should use for communicating with the network 108 of the existing data center 100, IP addresses of a DNS service running within the data center 100, and a range of IP addresses, subnet masks, and gateway IP address to be assigned to VMs 140 of the computing platform 102. In some embodiments, the infrastructure template 138 may be generated specific to an application deployed within the computing platform 102. As such, the infrastructure parameters contained in the infrastructure template 138 may address specific configurations, settings, and information needed by the application executing within the computing platform 102. An example of an application deployed within the computing platform 102 and a corresponding application-dependent infrastructure template 138 is described later in conjunction with FIGS. 3 and 4. It should be recognized that the infrastructure template 138 may be implemented as any suitable structured or semi-structured data structure, such as an Extensible Markup Language (XML) document, relational database, and key-value data store.

In some embodiments, the platform manager 130 may be configured to import and export infrastructure templates 138 so that the infrastructure templates 138 may be easily transferred between other instances of converged infrastructure (e.g., computing platform 102). The platform manager 130 may also import and export of infrastructure templates 138 to backup known configurations and settings of the computing platform 102, test and deploy a known infrastructure template 138, and perform other such administrative tasks.

In one embodiment, the platform manager 130 includes a resource configuration service 134 for configuring physical resources and virtual resources of the computing platform 102 based on an infrastructure template 138. For example, the resource configuration service 134 may configure the network switches and blades based on the infrastructure template 138 to allow communication between the converged infrastructure (e.g., computing platform 102) and the existing data center 100. In another example, the resource configuration service 134 may configure network interface cards (NICs) of VMs 140 running within the computing platform 102 based on infrastructure parameters of the infrastructure template 138.

Figure 2:
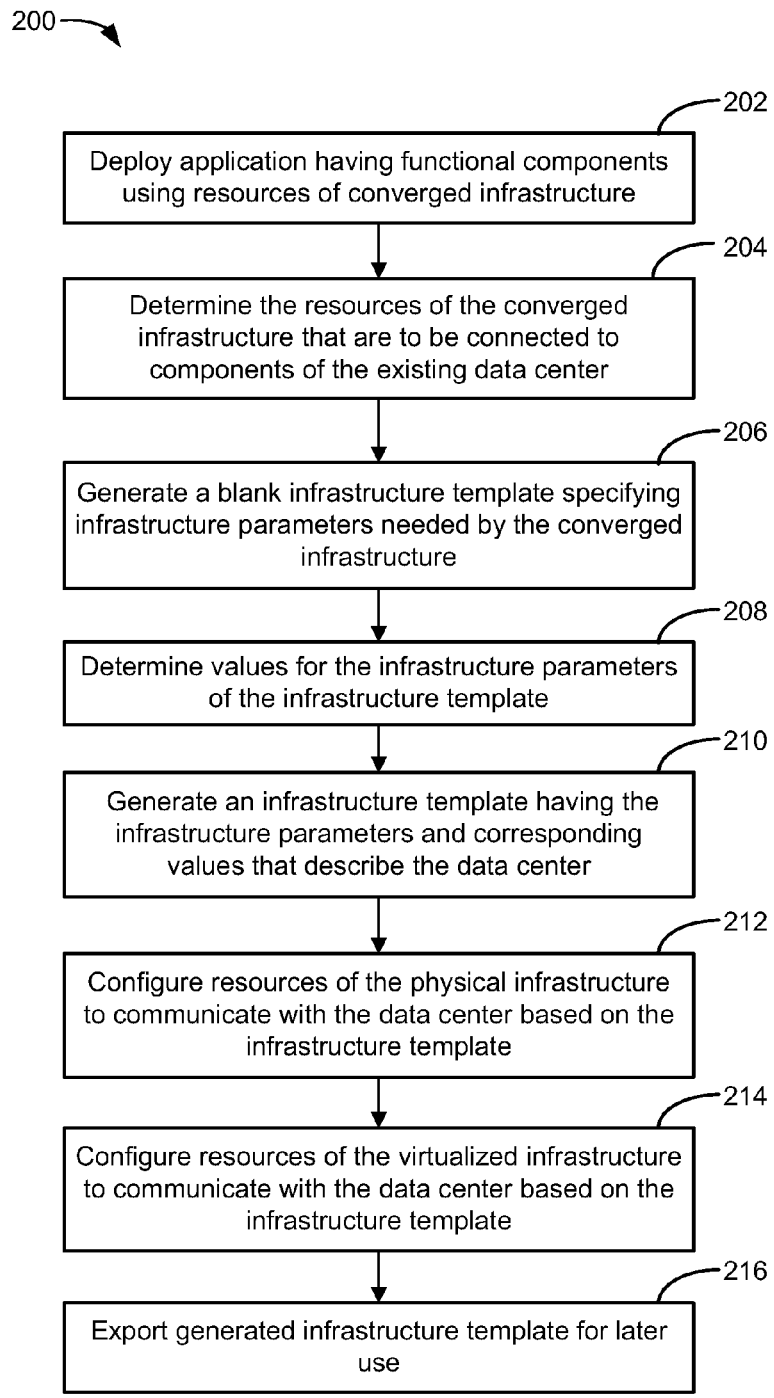
FIG. 2 is a flow diagram of method steps for deploying an integrated computing platform in an existing data center, according to certain aspects of the present disclosure.

FIG. 2 is a flow diagram of a method 200 for integrating a computing platform having an application executing thereon into an existing computing environment, according to one embodiment. Persons skilled in the art will understand that, even though the method 200 is described in conjunction with the systems of FIG. 1, any system configured to perform the method steps, in any order, is within the scope of embodiments of the present disclosure.

As shown, the method 200 begins at step 202, where the platform manager 130 deploys an application having one or more functional components using resources of the converged infrastructure (e.g., computing platform 102). Each functional component of the application performs one or more tasks of the application and/or provide a functional layer of the application (e.g., in a multi-tiered application). The functional components include a variety of software components, operating systems, and configurations (e.g., executing on a VM 140) that inter-operate to function as a multi-tiered application. For example, the functional components of a deployed web application may include a web server, application server, and database server, each executing on a VM 140 from the virtualized infrastructure 120.

In some embodiments, the platform manager 130 allocates physical and virtual resources from the computing platform 102 for executing the functional components. In one embodiment, the platform manager 130 may invoke a call that directs the virtualization manager 122 (e.g., through a set of APIs) to create one or more VMs (e.g., VMs 140) having virtual resources (e.g., VRAM, storage) to execute the functional components of the application. The platform manager 130 deploys instances of the functional components on the allocated resources. For example, the platform manager 130 may install software packages onto the provisioned VMs 140, or alternatively, the platform manager 130 may invoke a call that directs the virtualization manager 122 (e.g., through a set of APIs) to create one or more VMs (e.g., VMs 140) based on a pre-packaged VMs having the application components and guest operating system pre-installed thereon.

At step 204, the platform manager 130 determines the resources of the converged infrastructure (e.g., computing platform 102) that are to be connected to components of the existing computing environment (e.g., data center 100). In some embodiments, the platform manager 130 may receive input, e.g., from the system administrator 150, that identifies which resources of the converged infrastructure have to be configured and what configuration information the identified resources need (e.g., infrastructure parameters). The system administrator 150 may indicate to the platform manager 130 which VMs inside the converged infrastructure need to be accessed from outside of the converged infrastructure. The system administrator 150 may further indicate which networking components (e.g., network switches, hosts) need to be configured to allow integrated of the converged infrastructure 102 with the data center 100. For example, a system administrator 150 may provide input to the platform manager 130 that identifies a VM (e.g., "VM01") running a web server as part of an application executing in the computing platform 102. In this example, the system administrator 150 indicates the web server needs to be configured with at least one port with network connectivity (e.g., via a particular VLAN) to a public Internet for receiving web requests.

At step 206, the platform manager 130 generates a precursor to an infrastructure template that specifies the infrastructure parameters needed for the converged infrastructure to connect to the existing computing environment 100. The precursor to the infrastructure template may be a "blank" infrastructure template that names which parameters are needed but lacks the corresponding values. In some embodiments, the precursor to the infrastructure template may be pre-determined, and may be pre-generated for a specific application deployed within the computing platform 102.

At step 208, the platform manager 130 determines values for the infrastructure parameters contained in the infrastructure template 138. In some embodiments, the platform manager 130 may process the blank infrastructure template (e.g., generated at step 206) to determine what infrastructure parameters need to be determined. The platform manager 130 may prompt the system administrator 150 (e.g., via a step-by-step graphical "wizard") for values to the infrastructure parameters. In some embodiments, the platform manager 130 may derive values for some infrastructure parameters based on values of other infrastructure parameters received from the system administrator. For example, the platform manager 130 may deduce an "N+1" domain naming scheme based on infrastructure parameter values (e.g., "VM01.example.com," "VMO2.example.com") for servers 104 within the existing data center 100.

At step 210, the platform manager 130 generates an infrastructure template 138 that describes the environment of the data center 100 using the determined infrastructure parameters and their corresponding values. At step 212, the platform manager 130 configures the resources (e.g., network 114, servers 116, storage 118) of the physical infrastructure 110 based on the infrastructure template 138 to be able to communicate with the data center 100. At step 214, the platform manager 130 configures the resources (e.g., VMs 140) of the virtualized infrastructure 120 based on the infrastructure template 138 to be able to communicate with one or more services 106 of the data center 100. At step 216, the platform manager 130 may optionally export the generated infrastructure template 138 for later use, as described above.

In some embodiments, an infrastructure template 138 for integrating a computing platform 102 into an existing data center 100 may be configured specifically for a particular application and its functional components that are running within the computing platform 102. As such, the platform manager 130 determines values for infrastructure parameters (e.g., configurations, settings, and information) specific to the application executing within the computing platform 102. In one example, an application-dependent infrastructure template 138 may be generated for a virtual desktop infrastructure (VDI) running within the computing platform 102, and is shown in greater detail in FIG. 3.

Figure 3:
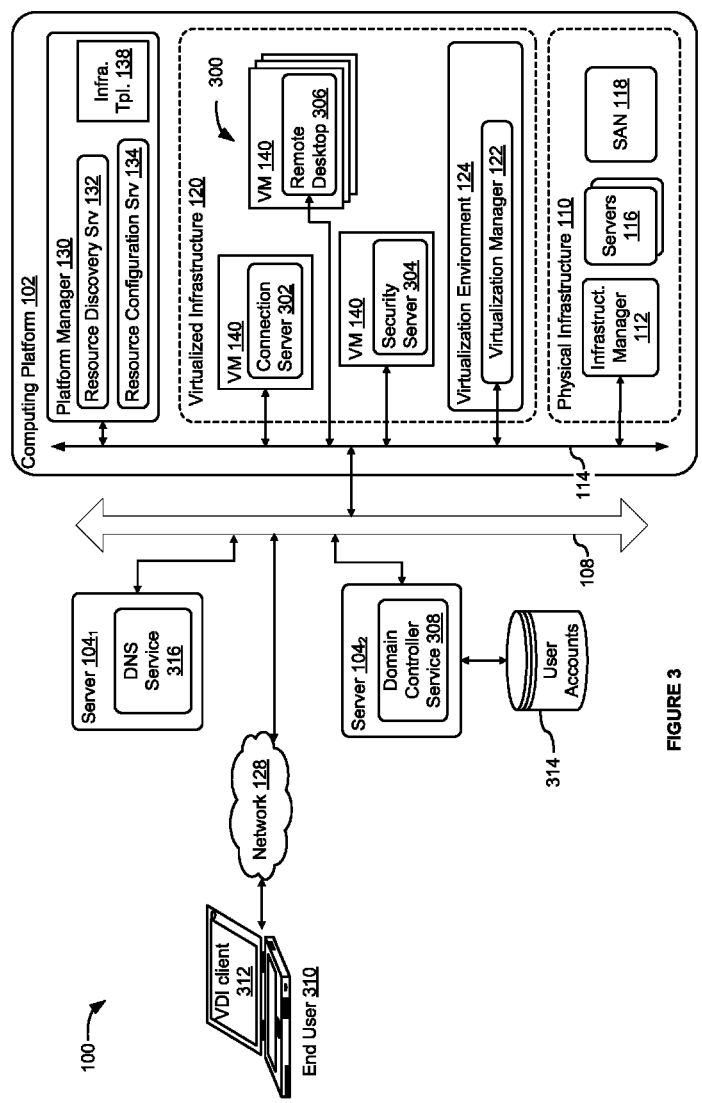
FIG. 3 illustrates an application-specific deployment of the integrated computing platform of FIG. 1, according to one embodiment of the present disclosure.

FIG. 3 illustrates a computing platform 102 executing an application 300 to be integrated into the existing data center 100, according to one embodiment of the present disclosure. As shown, the platform manager 130 may deploy a virtual desktop infrastructure (VDI) 300 on a plurality of VMs 140 within the virtualized infrastructure 120. One example of VDI system 300 includes the VMware View system available from VMware, Inc.

In a VDI system 300, an end user 310 uses a VDI client software program (e.g., VDI client 312), running on an operating system of a local computing device, to access their desktop which may be running in one of VMs 140 in the computing platform 102 that may be remote from the end user's location. Note, the term "desktop" generally refers to the instance of an interactive operating environment provided by a computer operating system and software applications, typically in the form of a display and sound output and keyboard and mouse input. With VDI clients 312, users can access remote desktops 306 running in a remote data center (e.g., computing platform 102) through the network 128, from any location, using a general purpose computer running a commodity operating system and a VDI client software program such as VMware® View™, or a special purpose thin client such as those available from Dell, HP, NEC, Sun Microsystems, Wyse, and others.

As shown, the VDI system 300 includes a connection server 302 that provides user authentication for remote desktops 306 and direct incoming desktop requests (e.g., from VDI client 312) to a corresponding remote desktop 306. Illustratively, the VDI system 300 further includes one or more security servers 304 (e.g., executing in one or more VMs 140) that enable secure access to the remote desktops 306 from an external network, such as the Internet. The security server 304 may act as a proxy host for connections inside a trust network (e.g., network 114) and shields the connection server 302 from request a public-facing Internet. For simplicity, a single network is shown but it should be recognized that, in actual implementations, the components of VDI system 300 may be connected over the same network or different networks. Furthermore, a particular configuration of the virtualized desktop infrastructure is described above and illustrated in FIG. 3, but it should be recognized that one or more embodiments of the present invention may be practiced with other configurations of the virtualized desktop infrastructure.

During deployment of the VDI system 300 and the computing platform 102 within the data center 100, the connection server 302 may be connected to a domain controller 308, such as Microsoft® Active Directory®, already running within the existing data center 100 (e.g., on a server $104_2$). The domain controller 308 manages user accounts 314 (e.g., a user account for end user 310) including user log-in information and credentials. Further, the connection server 302 and security server 304 may be connected to a domain name system (DNS) service 316 which is installed on a server $104_2$ outside of the computing platform 102 to provide domain names to the functional components of the VDI system 300 (e.g., connection server 302, security server 304, and remote desktops 306). The virtualization manager 122 may need to be connected with a "management plane" within the data center 100 and be able to access the connection server 302 and security server 304. A network architecture for the VDI system 300 may be set up that includes one or more virtual local access networks (VLANs) between the connection server 302, security server 304, remote desktops 306, domain controller 308, DNS service 316 across networks 108 and 114. For example, a system administrator 150 needs access to the connection server 302 and security server 304 to configure them. Further, a VDI client 312 operated by an end user 310 would need access to the connection server 302 and the security server 304 (e.g., via the networks 128, 108, 114). The one-to-many relationships between the functional components of the VDI system 300 and the network 128 of the data center 100 that would need to be extended onto the computing platform 102 to ensure proper operation of the VDI system 300.

While FIG. 3 depicts a particular example of an application (e.g., VDI system 300), other applications running within the computing platform 102 may be deployed that have components that connect to and communicate with services 106 executing in the data center 100. For example, a computing platform 102 having an application with an application server layer, a data grid layer, and a database layer may be integrated within the services of the existing data center 100.

Figure 4:
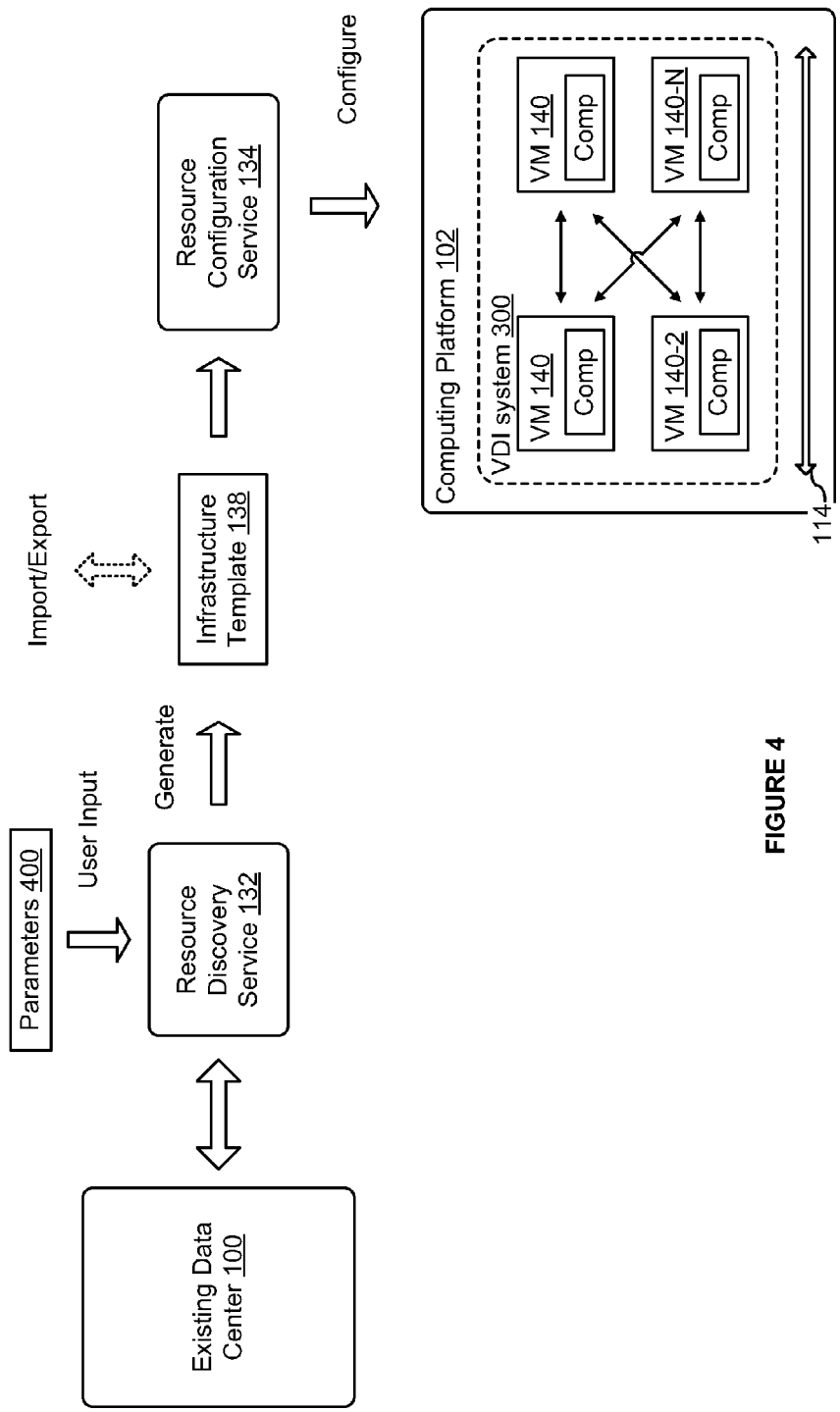
FIG. 4 illustrates an example workflow for deploying the integrated computing platform of FIG. 1 in an existing data center, according to one embodiment of the present disclosure.

FIG. 4 illustrates an example workflow for integrating the computing platform of FIG. 3 within an existing data center 100, according to one embodiment of the present disclosure. As shown, the resource discovery service 132 identifies resources (e.g., servers 104) that are of interest to the VDI system 300. For example, the resource discovery service 132 may identify the existing data center 100 having at least a domain controller 308, a DNS service 316, and a network 108. In some embodiments, the resource discovery service 132 discovers resources the VMs 140 that host the functional components of the VDI system 300 that need to be access from outside of the computing platform 102. The resource discovery service 132 further discovers the networking components (e.g., network switches, hosts) that need to be configured to allow integration of the computing platform 102 with the data center 100.

In one embodiment, the platform manager 130 may use a predetermined blank infrastructure template associated with the VDI system 300 for integrating the computing platform 102 with the data center 100. The infrastructure template identifies configurations, settings, and other set-up anticipated to be needed by the functional components of the VDI system 300. In some embodiments, the infrastructure template 138 for an instance of VDI system 300 may contain configurations for properly connecting the connection server 302 to the domain controller 308, for properly connecting the security server 304 to the network 108, and for properly connecting the plurality of remote desktops 306 to the network 108. Examples of infrastructure parameters specified by the infrastructure template 138 include an IP address configured for management of the domain controller 308, an IP address configured for access to the domain controller 308, authentication information for the domain controller 308, a VLAN ID that the computing platform 102 should use for communicating with the "management plane" of the data center 100, a VLAN ID that the computing platform 102 should use for communicating with the data center "access" network, a range of IP addresses for management and user access to be assigned to the functional components of the VDI system 300, the IP address of the DNS service 316 on the data center network 108, and a subnet mask and gateway IP address for the VMs 140 within the computing platform 102.

As shown, the system administrator 150 provides the resource discovery service 132 with values for infrastructure parameters 400 (e.g., via a graphical user interface). For example, the system administrator 150, in response to a GUI query, may specify the DNS service 316 running in the data center 100 may be located at the IP address "192.168.15.150". In another example, the system administrator 150 may specify a VLAN for functional components of the VDI system 300 having a VLAN ID of "4040" and a VLAN label of "Infra". In some embodiments, the platform manager 130 may derive values for some infrastructure parameters for the VDI system 300 based on values of other infrastructure parameters received from the system administrator. For example, it has been determined that under certain deployments of a VDI system 300, it may be advantageous to have user accounts 314 organized into a specific "organizational unit" for use with VDI system 300. As such, using the IP address and authentication information of the domain controller network, the platform manager 130 may connect to the domain controller 308 to determine whether such an organizational unit (OU) already exists, and if not, to create one for use with the VDI system 300.

The platform manager 130 generates the infrastructure template 138 for integrating the computing platform 102 having the specific application (e.g., VDI system 300) executing within. An example of an infrastructure template generated for integrating a computing platform 102 having a deployed VDI system 300 with the data center 100 is shown in Table 1 below.

TABLE 1

Sample Infrastructure Template

```
<?xml version="1.0" encoding="UTF-8" ?>
<Infra-Template>
    <VLans>
        <VLan>
            <id>4040</id>
            <name>Infra</name>
        </VLan>
        <VLan>
            <id>4051</id>
            <name>Client</name>
        </VLan>
    </VLans>
    <DHCPVirtualMachines>
        <VMNameFilters>
            <VMNameFilter>*CLIENT*</VMNameFilter>
            <VMNameFilter>SC-*</VMNameFilter>
        </VMNameFilters>
    </DHCPVirtualMachines>
    <VirtualMachinesWithStaticIp>
    <VM>
        <VMName>VM01</VMName>
        <Ip>192.168.15.150</Ip>
        <GatewayIp> 192.168.15.1</GatewayIp>
        <mask>255.255.255.0</mask>
        <DNS>I92.168.15.150</DNS>
        <Domain>example.com</Domain>
    </VM>
    <VM>
        <VMName>VM02</VMName>
        <Ip> 192.168.15.151</Ip>
        <GatewayIp> 192.168.15.1</GatewayIp>
        <mask>255.255.255.0</mask>
        <DNS>192.168.15.150</DNS>
        <Domain>example.com</Domain>
    </VM>
    </VirtualMachinesWithStaticIp>
</Infra-Template>
```

In some embodiments, the generated infrastructure template 138 may be exported for later re-use. Additionally, a pre-generated infrastructure template 138 may be imported from an earlier deployment of an instance of the computing platform 102 and used to integrate the computing platform 102 within the data center 100.

As shown, the resource configuration service 134 uses the infrastructure template 138 to configure the resources of the computing platform 102 to inter-operate with the services 106 of the data center 100. In one embodiment, the resource configuration service 134 configures the network components (e.g., network 114) and hosts (e.g., servers 116) to create VLANs using parameters specified in the infrastructure template 138. In one embodiment, the resource configuration service 134 adds a network interface card (NIC) to VMs 140 that have need to be accessed from outside of the computing platform 102 and configures the NICs using parameters specified in the resource configuration service 134.

Accordingly, embodiments of the present disclosure advantageously reduce the time to integrate components of a converged infrastructure with services of a data center. Embodiments of the present disclosure further reduce the risk of error during configuration of network resources and security services, which may be a manual and error-prone process.

Various embodiments of the present disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

While the foregoing is directed to embodiments of the present disclosure, other and further embodiments of the present disclosure may be devised without departing from the basic scope thereof, and the scope thereof is determined by the claims that follow.

The invention claimed is:

1. A method for deploying an integrated computing platform into an existing computing environment, the method comprising:
    generating an infrastructure template having a plurality of infrastructure parameters that specify configurations of a service executing within the existing computing environment;
    modifying a configuration of networking and virtual resources from the integrated computing platform configured to execute one or more functional components of an application, wherein the configuration is modified based on the infrastructure template to enable communication between the functional components of the application and the service executing within the existing computing environment.

2. The method of claim 1, further comprising:
    receiving, from user input, a plurality of values for the infrastructure parameters in response to a query via a graphical user interface.

3. The method of claim 1, further comprising:
    configuring one or more virtual local area networks (VLANs) based on one or more of the infrastructure parameters provided by the infrastructure template.

4. The method of claim 1, further comprising:
    allocating a virtual machine (VM) configured to execute one of the functional components of the application; and
    configuring a network interface card (NIC) for the VM based on the infrastructure parameters provided by the infrastructure template.

5. The method of claim 1, further comprising:
    allocating a plurality of virtual machine (VMs) configured to execute one or more of the functional components of a virtual desktop infrastructure, wherein the functional components comprise at least one of a connection server, a security server, and a virtual machine management server.

6. The method of claim 5, further comprising:
    configuring at least one of the VMs executing a connection server component of the virtual desktop infrastructure based on the infrastructure parameters provided by the infrastructure template, wherein at least one of the infrastructure parameters are associated with a user directory service executing within the existing computing environment.

7. The method of claim 1, wherein the infrastructure template includes one or more parameters specifying network settings of the existing computing environment.

8. The method of claim 1, wherein the generating the infrastructure template comprises:
    deriving at least one of the plurality of infrastructure parameters based on infrastructure parameters values provided by a graphical user interface.

9. The method of claim 1, further comprising:
    identifying the virtual resources of the integrated computing platform that are executing functional components of the application and that require communication with the services of the existing computing platform;
    identifying the network resources of the integrated computing platform that require communication with the services of the existing computing platform;
    generating a framework for the infrastructure template based on the identified virtual and network resources; and
    generating the infrastructure template.

10. A computing system for deploying an integrated computing platform into an existing computing environment, comprising:
    a management server configured to:
    generate an infrastructure template having a plurality of infrastructure parameters that specify configurations of a service executing within the existing computing environment; and
    modify a configuration of networking and virtual resources from the integrated computing platform configured to execute one or more functional components of an application, wherein the configuration is modified based on the infrastructure template to enable communication between the functional components of the application and the service executing within the existing computing environment.

11. The computing system of claim 10, wherein the management server is further configured to receive, from user input, a plurality of values for the infrastructure parameters in response to a query via a graphical user interface.

12. The computing system of claim 10, wherein the Management server is further configured to configure one or more virtual local area networks (VLANs) based on one or more infrastructure parameters provided by the infrastructure template.

13. The computing system of claim 10, wherein the management server is further configured to:
    allocate a virtual machine (VM) configured to execute one of the functional components of the application; and
    configure a network interface card (NIC) for the VM based on the infrastructure parameters provided by the infrastructure template.

14. The computing system of claim 10, wherein the management server is further configured to allocate a plurality of virtual machine (VMs) configured to execute one or more of the functional components of a virtual desktop infrastructure, wherein the functional components comprise at least one of a connection server, a security server, and a virtual machine management server.

15. The computing system of claim 14, wherein the management server is further configured to configure at least one of the VMs executing a connection server component of the virtual desktop infrastructure based on the infrastructure parameters provided by the infrastructure template, wherein at least one of the infrastructure parameters are associated with a user directory service executing within the existing computing environment.

16. The computing system of claim 10, wherein the infrastructure template includes one or more parameters specifying network settings of the existing computing environment.

17. The computing system of claim 10, wherein the management server configured to generate the infrastructure template is further configured to:
    derive at least one of the plurality of infrastructure parameters based on infrastructure parameters values provided by a graphical user interface.

18. The computing system of claim 10, wherein the management server is further configured to:
    identify the virtual resources of the integrated computing platform that are executing functional components of the application and that require communication with the services of the existing computing platform;
    identify the network resources of the integrated computing platform that require communication with the services of the existing computing platform;
    generate a framework for the infrastructure template based on the identified virtual and network resources; and
    generate the infrastructure template.

19. A non-transitory computer-readable storage medium comprising instructions
    that, when executed in a computing device, deploy an integrated computing platform into an existing computing environment, by performing the steps of:
    generating an infrastructure template having a plurality of infrastructure parameters that specify configurations of a service executing within the existing computing environment; and
    modifying a configuration of networking, and virtual resources from the integrated computing platform configured to execute one or more functional components of an application, wherein the configuration is modified based on the infrastructure template to enable communication between the functional components of the application and the service executing within the existing computing environment.

20. The non-transitory computer-readable storage medium of claim 19, further comprising instructions for:
    receiving, from user input, a plurality of values for the infrastructure parameters in response to a query via a graphical user interface.

21. The non-transitory computer-readable storage medium of claim 19, further comprising instructions for:
    configuring one or more virtual local area networks (VLANs) based on one or more of the infrastructure parameters provided by the infrastructure template.

22. The non-transitory computer-readable storage medium of claim 19, further comprising instructions for:
    allocating a virtual machine (VM) configured to execute one of the functional components of the application; and
    configuring a network interface card (NIC) for the VM based on the infrastructure parameters provided by the infrastructure template.

23. The non-transitory computer-readable storage medium of claim 19, further comprising instructions for:
    allocating a plurality of virtual machine (VMs) configured to execute one or more of the functional components of a virtual desktop infrastructure, wherein the functional components comprise at least one of a connection server, a security server, and a virtual machine management server.

24. The non-transitory computer-readable storage medium of claim 23, further comprising instructions for:
    configuring at least one of the VMs executing a connection server component of the virtual desktop infrastructure based on, the infrastructure parameters provided by the infrastructure template, wherein at least one of the infrastructure parameters are associated with a user directory service executing within the existing computing environment.

25. The non-transitory computer-readable storage medium of claim 19, wherein the infrastructure template includes one or more parameters specifying network settings of the existing computing environment.

26. The non-transitory computer-readable storage medium of claim 19, wherein the instructions for generating the infrastructure template further comprises instructions for: deriving at least one of the plurality of infrastructure parameters based on infrastructure parameters values provided by a graphical user interface.

27. The non-transitory computer-readable storage medium of claim 19, further comprising instructions for:
    identifying the virtual resources of the integrated computing platform that are executing functional components of the application and that require communication with the services of the existing computing platform;
    identifying the network resources of the integrated computing platform that require communication with the services of the existing computing platform;
    generating a framework for the infrastructure template based on the identified virtual and network resources; and
    generating the infrastructure template.

* * * * *